(12) United States Patent
Chen

(10) Patent No.: US 9,268,371 B2
(45) Date of Patent: Feb. 23, 2016

(54) HINGE MODULE AND ELECTRONIC DEVICE USING THE SAME

(71) Applicant: Pegatron Corporation, Taipei (TW)

(72) Inventor: Yu-Chun Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 14/311,504

(22) Filed: Jun. 23, 2014

(65) Prior Publication Data

US 2015/0007416 A1 Jan. 8, 2015

(30) Foreign Application Priority Data

Jul. 5, 2013 (TW) .............................. 102124280 A

(51) Int. Cl.
*E05D 3/06* (2006.01)
*G06F 1/16* (2006.01)

(52) U.S. Cl.
CPC ............ *G06F 1/1681* (2013.01); *G06F 1/1618* (2013.01); *E05Y 2900/606* (2013.01); *Y10T 16/557* (2015.01)

(58) Field of Classification Search
USPC .............. 16/366; 361/679.27, 679.34, 679.59
See application file for complete search history.

(56) References Cited

U.S. PATENT DOCUMENTS 5,410,447 A * 4/1995 Miyagawa et al. ...... 361/679.09
6,251,493 B1 * 6/2001 Johnson et al. ................ 428/71
6,536,728 B1 * 3/2003 Hagglund et al. ......... 248/286.1
8,493,730 B2 * 7/2013 Shim et al. ............... 361/679.55
8,615,848 B2 * 12/2013 Mitsui .............................. 16/366
8,776,319 B1 * 7/2014 Chang et al. .................... 16/366
2003/0179543 A1 * 9/2003 Sri-Jayantha et al. ........ 361/683
2006/0197861 A1 * 9/2006 Won et al. ................ 348/333.06
2011/0255225 A1 * 10/2011 Chen ........................ 361/679.01
2013/0135809 A1 * 5/2013 Uchiyama et al. ........ 361/679.09

FOREIGN PATENT DOCUMENTS

TW M450182 4/2013

OTHER PUBLICATIONS

Taiwan Office Action dated Feb. 13, 2015.
English translation of abstract of TW M450182 (published Apr. 1, 2013).

* cited by examiner

*Primary Examiner* — Victor Batson
*Assistant Examiner* — Matthew Sullivan
(74) *Attorney, Agent, or Firm* — McClure, Qualey & Rodack, LLP

(57) ABSTRACT

A hinge module for an electronic device includes a main body and an upper cover. The hinge module includes a biaxial hinge and a pad. The biaxial hinge includes a first rotary shaft, a second rotary shaft and a connecting member. One end of the first rotary shaft is fixed to the main body, and another end of the first rotary shaft being pivotally connected with the connecting member. One end of the second rotary shaft is fixed to the upper cover, and another end of the second rotary shaft is pivotally connected with the connecting member. The pad is disposed at the connecting member of the biaxial hinge. When the upper cover rotates with respect to the main body, the connecting member and the pad rotates using the first rotary shaft as a rotation axis.

16 Claims, 15 Drawing Sheets

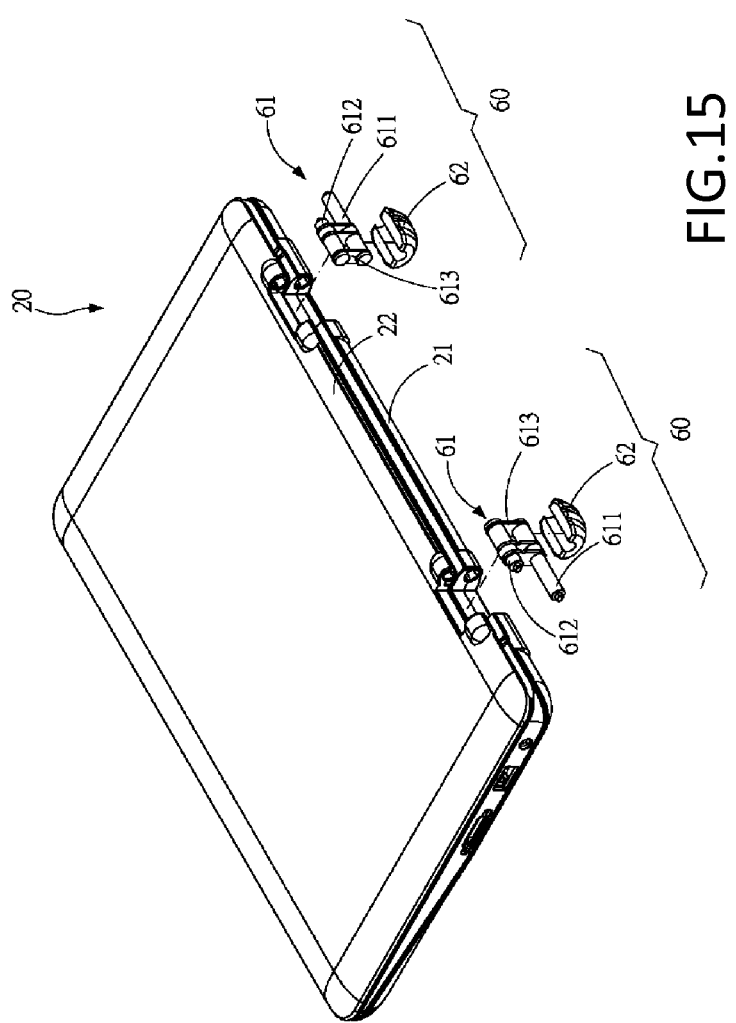

HINGE MODULE AND ELECTRONIC DEVICE USING THE SAME

CROSS-REFERENCE TO RELATED APPLICATIONS

This Non-provisional application claims priority under 35 U.S.C. §119(a) on Patent Application No(s). 102124280 filed in Taiwan, Republic of China on Jul. 5, 2013, the entire contents of which are hereby incorporated by reference.

BACKGROUND

1. Field of Invention

The invention relates to a hinge module for an electronic device and, in particular, to a hinge module suitable for a notebook computer.

2. Related Art

With the hot-selling of notebooks having touch panels and related control systems, it is a trend for notebooks to become more and more close to tablets. Except for transformed tablets, notebooks having displays that can be rotated 360 degrees have emerged. Those displays can be rotated to the back of the keyboards, so that the notebooks can be operated as tablets when being placed with the keyboards facing toward the desk surface.

Please refer to FIG. 1 to FIG. 4, which are perspective views of different use statuses of a 360-degree-rotatable notebook and the configuration of the pads. As shown in FIG. 1 to FIG. 4, a notebook 10 includes an upper cover 11 and a lower cover 12. The upper cover 11 has a display 111. A first surface 121 of the lower cover 12 is provided with a keyboard 13 and four pads 14. A second surface of the lower cover 12 is also provided with four pads 14.

In FIG. 1 and FIG. 2, the notebook 10 is in a keyboard mode, and the angle between the display 111 and the keyboard 13 is between 0° and 180°. Under this mode, the notebook 10 is used while being placed on a desk surface. The pads 14 at the four corners of the second surface 122 of the lower cover 12 contacting with the desk surface are for anti-slip and shock absorption purposes.

In FIG. 3 and FIG. 4, the notebook 10 is in a tablet mode, and the angle between the display 111 and the keyboard 13 is between 180° and 360°. Under this mode, the first surface 121 of the notebook 10 is placed in the desk surface. The four corners of the first surface 121 is provided with pads 14 to prevent the keys of the keyboard 13 at the first surface from being pressed while achieving the objectives of anti-slip and shock absorption.

However, such design increases the number of pads required, while also increases assembly time during the assembly process. Moreover, to provide pads 14 at the four corners of the first surface 121 also affect the integrity of the overall appearance of the notebook 10.

SUMMARY

In view of the above, the invention provides a hinge module and an electronic device using the same. By reducing the number of the pad used, except for avoiding the undermine of the overall visual feeling, the number of the components and the assembly steps can be reduced, which achieve the objective of reducing manufacturing costs and assembly time significantly.

To achieve the above objectives, the invention provides a hinge module for an electronic device. The electronic device includes a main body and an upper cover. The hinge module includes a biaxial hinge and a pad. The biaxial hinge includes a first rotary shaft, a second rotary shaft and a connecting member. One end of the first rotary shaft is fixed to the main body, and another end of the first rotary shaft is pivotally connected with the connecting member. One end of the second rotary shaft is fixed to the upper cover, and another end of the second rotary shaft is pivotally connected with the connecting member. The pad is disposed at the connecting member of the biaxial hinge. When the upper cover rotates with respect to the main body, the connecting member and the pad rotates using the first rotary shaft as a rotation axis.

Another aspect of the invention is an electronic device including a main body, an upper cover and a hinge module. The hinge module includes a biaxial hinge and a pad. The biaxial hinge includes a first rotary shaft, a second rotary shaft and a connecting member. One end of the first rotary shaft is fixed to the main body, and another end of the first rotary shaft is pivotally connected with the connecting member. One end of the second rotary shaft is fixed to the upper cover, and another end of the second rotary shaft is pivotally connected with the connecting member. The pad is disposed at the connecting member of the biaxial hinge. When the upper cover rotates with respect to the main body, the connecting member and the pad rotates using the first rotary shaft as a rotation axis.

By disposing the pad at the connecting member of the biaxial hinge, the number of the pad used can be reduced, and the disposition of the pad can be accomplished simultaneously with the assembly of the biaxial hinge. Therefore, using the hinge module of the invention in an electronic device not only reduces the number of the pad used, but also avoids the adverse effect of the overall visual feeling of the electronic device. The assembly steps can also be simplified to reduce both manufacturing costs and assembly time significantly.

BRIEF DESCRIPTION OF THE DRAWINGS

The invention will become more fully understood from the detailed description and accompanying drawings, which are given for illustration only, and thus are not limitative of the present invention, and wherein:

FIG. 15 is an exploded diagram of the electronic device of the third embodiment of the invention.

DETAILED DESCRIPTION

Figure 1:
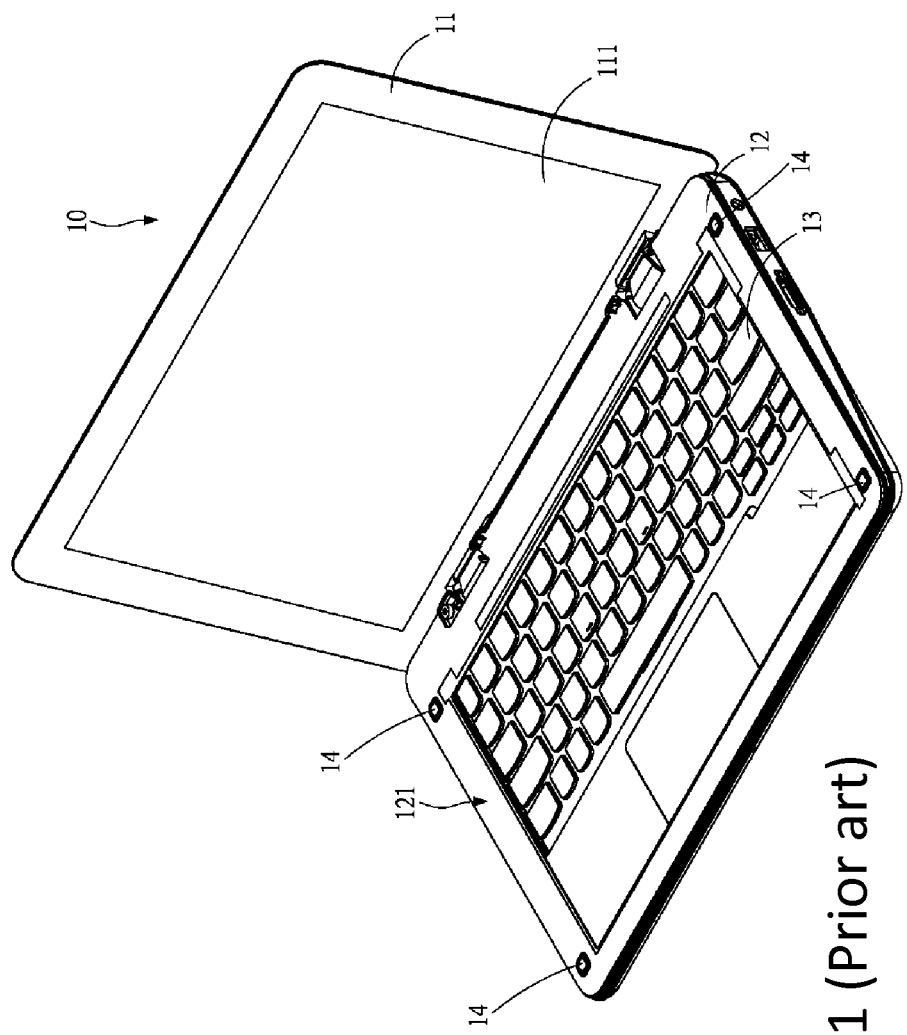
FIG. 1 is a front view of a notebook computer under a keyboard mode in the prior art.
Figure 2:
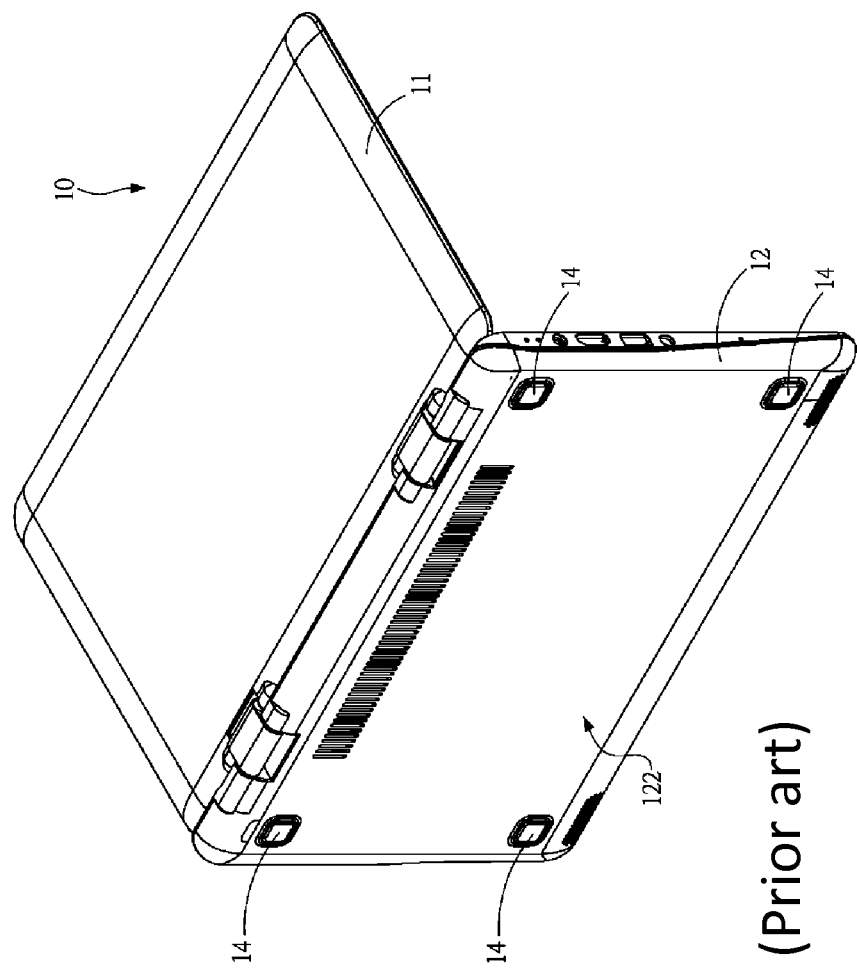
FIG. 2 is a rear view of a notebook computer under a keyboard mode in the prior art.
Figure 3:
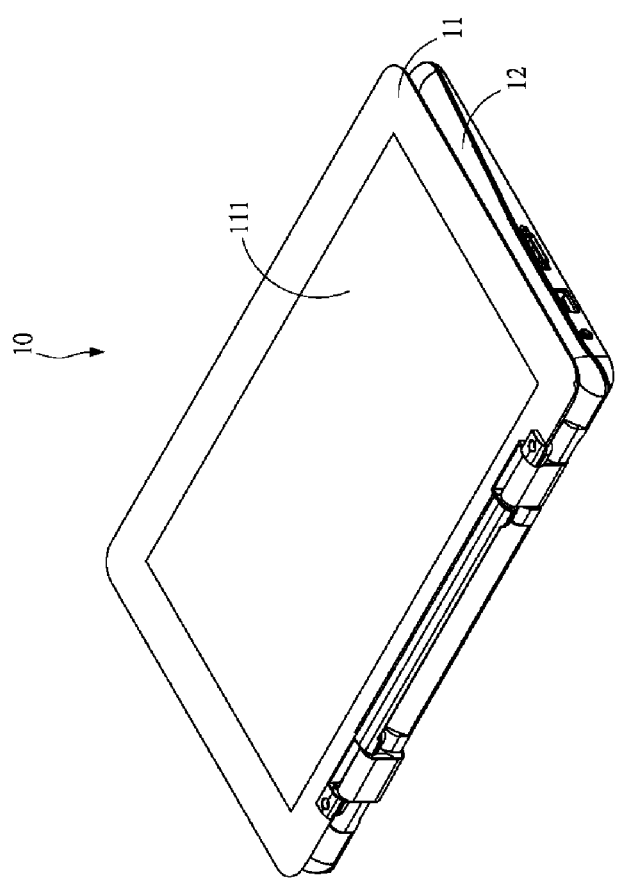
FIG. 3 is a top view of a notebook computer under a tablet mode in the prior art.
Figure 4:
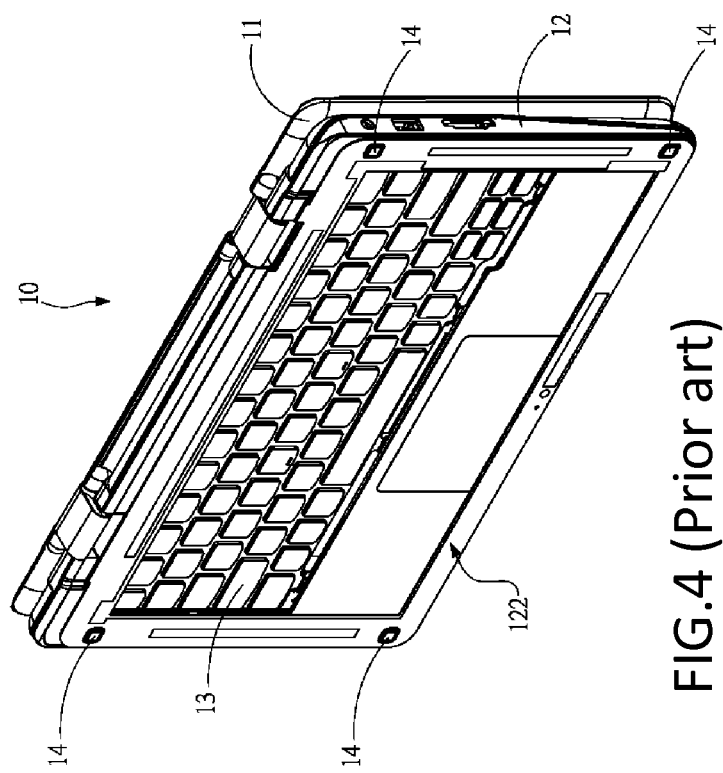
FIG. 4 is a bottom view of a notebook computer under a tablet mode in the prior art.
Figure 5:
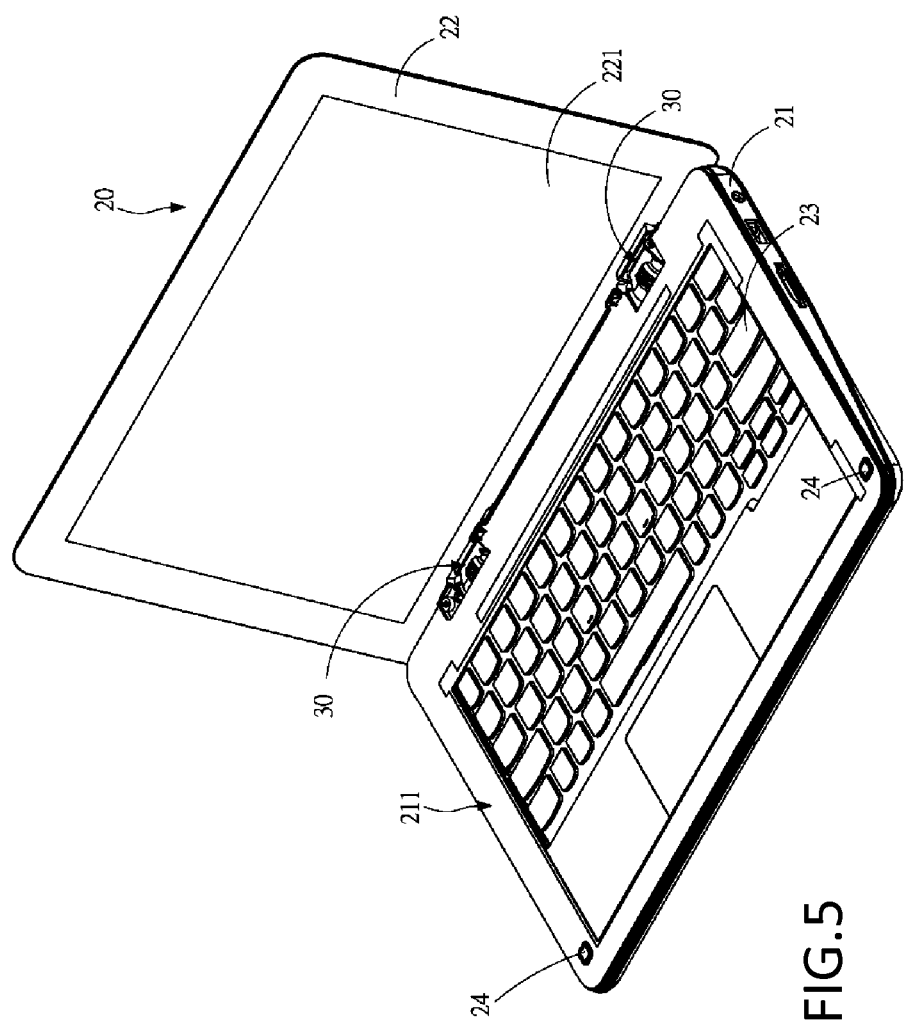
FIG. 5 is a front view of the electronic device according to the first embodiment of the invention.
Figure 6:
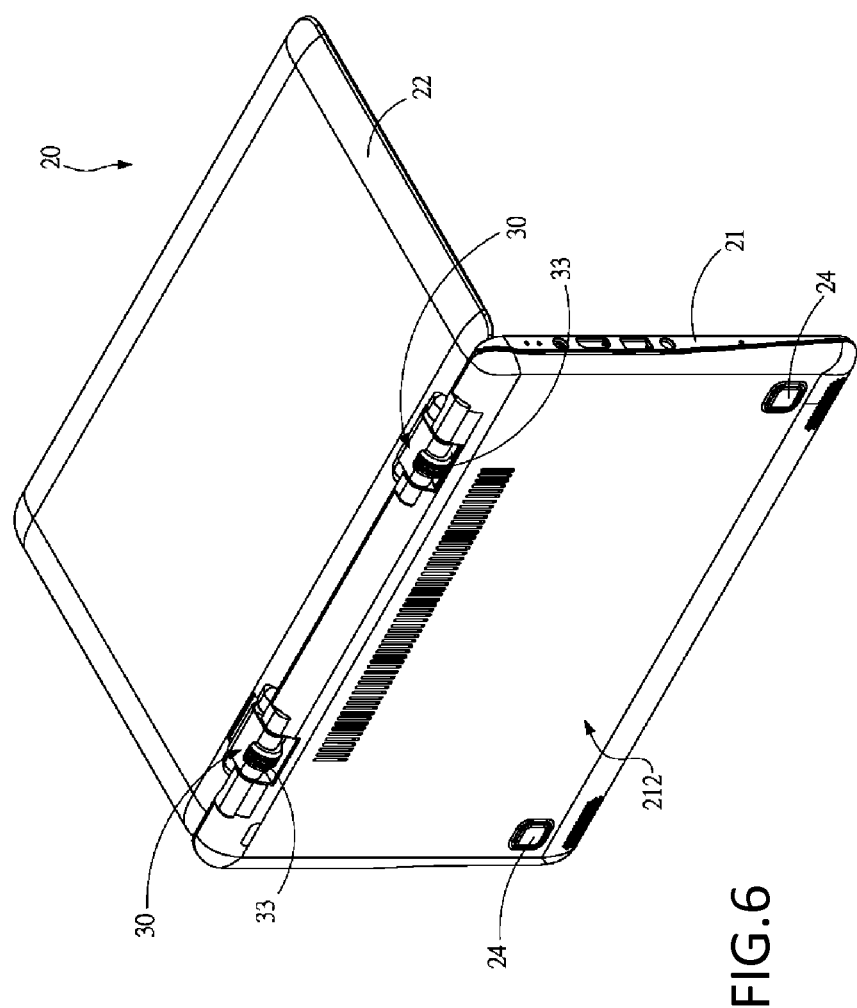
FIG. 6 is a rear view of the electronic device according to the first embodiment of the invention.
Figure 7:
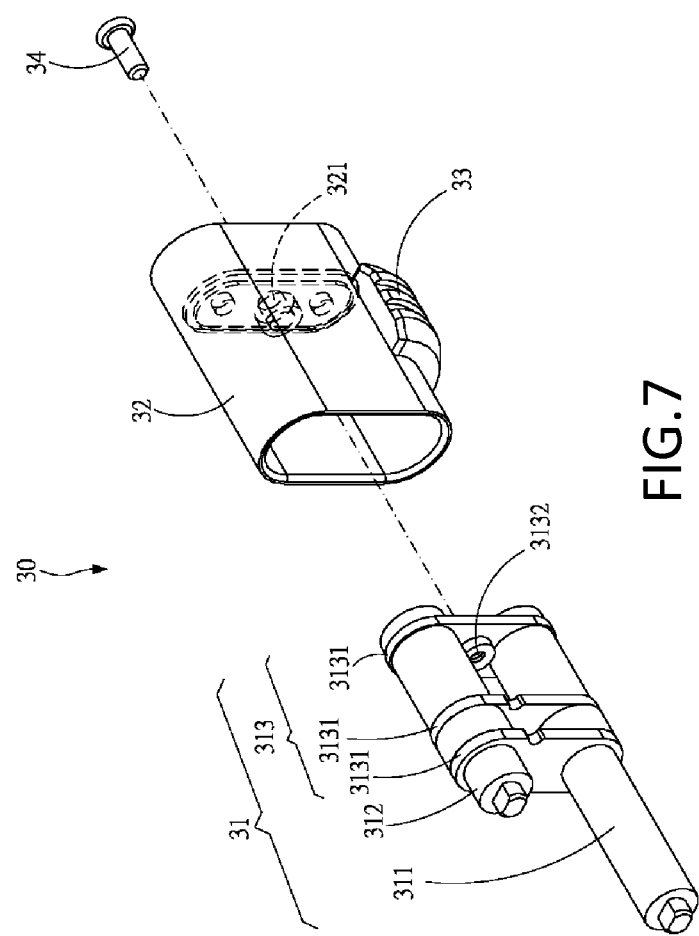
FIG. 7 is an exploded diagram of the hinge structure according to the first embodiment of the invention.
Figure 8:
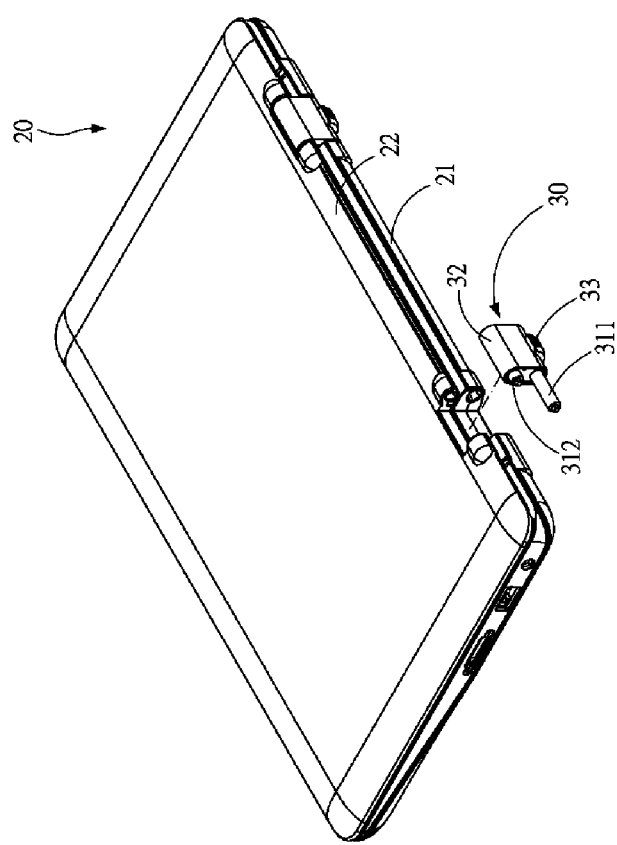
FIG. 8 is a schematic diagram of the position of the hinge module according to the first embodiment of the invention.

Please refer to FIG. 5 to FIG. 8, wherein FIG. 5 is a front view of the electronic device 20 according to the first embodiment of the invention, FIG. 6 is a rear view of the electronic device 20, FIG. 7 is an exploded diagram of the hinge module, and FIG. 8 is a schematic diagram of the position of the hinge module. As shown in FIG. 5 and FIG. 6, the electronic device 20 according to the present embodiment includes a main body 21, an upper cover 22 and two hinge modules 30. The main body 21 is pivotally connected with the upper cover 22 via the two hinge modules 30. Although in the present embodiment two hinge modules are used, in other embodiments one or more hinge modules 30 may be used to pivotally connect the main body 21 to the upper cover 22. The invention is not limited therein. The first surface 211 of the main body 21 is provided with a keyboard 23 and two pads 24, and the second surface 212 is also provided with two pads 24. A display 221 is provided at the upper cover 22.

As shown in FIG. 7 and FIG. 8, each hinge module 30 includes a biaxial hinge 31, a housing 32 and a pad 33. The biaxial hinge 31 includes a first rotary shaft 311, a second rotary shaft 312 and a connecting member 313. One end of the first rotary shaft 311 is fixed to the main body 21, and the other end of the first rotary shaft 311 is pivotally connected with the connecting member 313. One end of the second rotary shaft 312 is fixed to the upper cover 22, and the other end of the second rotary shaft 312 is pivotally connected with the connecting member 313. When the upper cover 22 rotates with respect to the main body 21, the housing 32 and the connecting member 313 rotate with the first rotary shaft 311 as the rotation axis. As shown in FIG. 7, the first rotary shaft 311 and the second rotary shaft 312 are connected via the connecting member 313 and are disposed in parallel with a distance. To strengthen the stability of connection between the first rotary shaft 311 and the second rotary shaft 312, the connecting member 313 may include a plurality of rib members 3131 disposed in parallel. The two ends of each rib member 3131 are connected to the shaft body of the first rotary shaft 311 and the shaft body of the second rotary shaft 312, respectively.

Please refer to FIG. 7, the housing 32 is disposed around the biaxial hinge 31 and is fixed to the connecting member 313. In the present embodiment, one rib member 3131 of the connecting member 313 has a threaded hole 3132, while the inside of the housing 32 has a through hole 321. When the housing 32 is disposed around the biaxial hinge 31, a screw 34 passes through the through hole 321 of the housing 32 and is screwed at the threaded hole 3132 of the connecting member 313. In other embodiments, the housing 32 may be made of resilient material, and may be disposed around the biaxial hinge 31 tightly. Alternatively, the housing 32 may be fixed to the connecting member 313 by adhesion.

The pad 33 is provided one side of the housing 32 corresponding to the first rotary shaft 311. In the present embodiment, the pad 33 has U-shaped cross section and covers a portion of the first rotary shaft 311.

Figure 9:
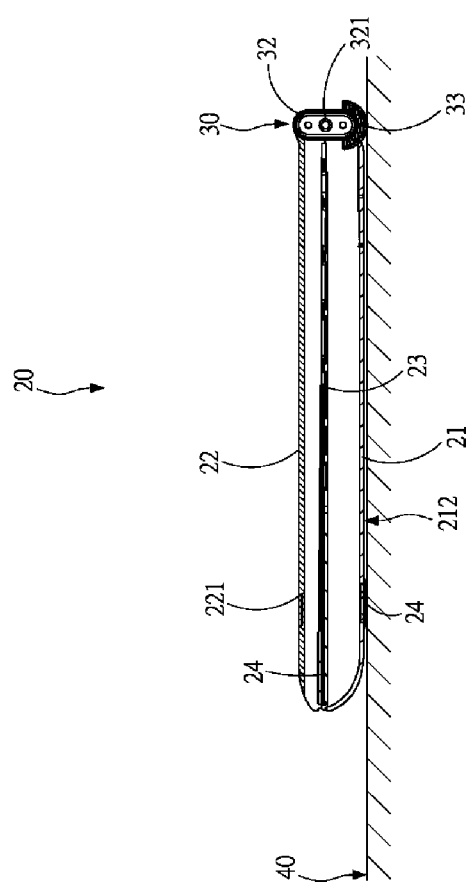
FIGS. 9 to 13 are sectional views of the upper cover rotated to different angles according to the first embodiment of the invention.
Figure 10:
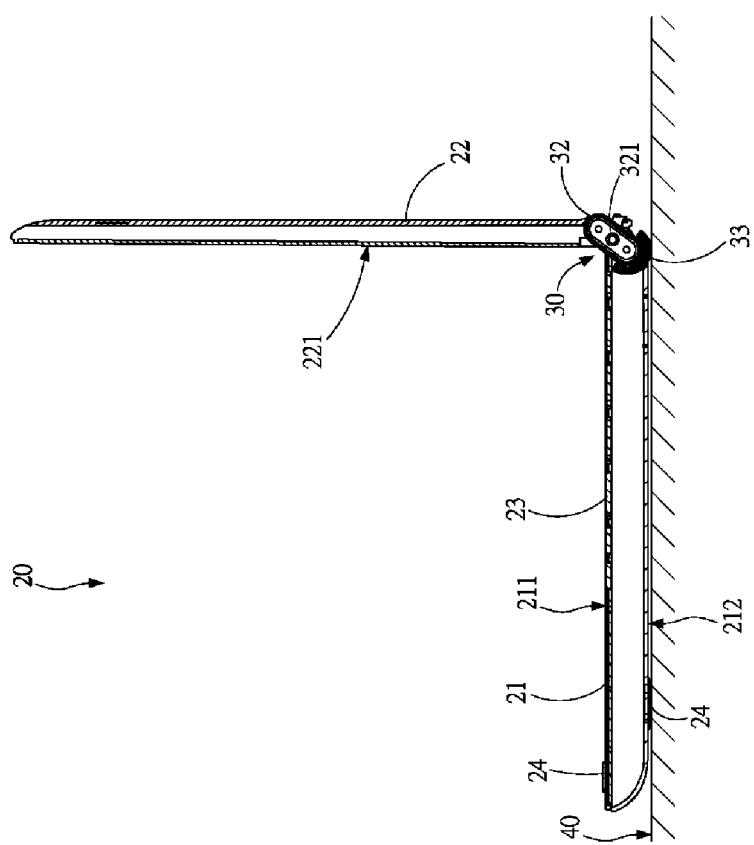
Figure 11:
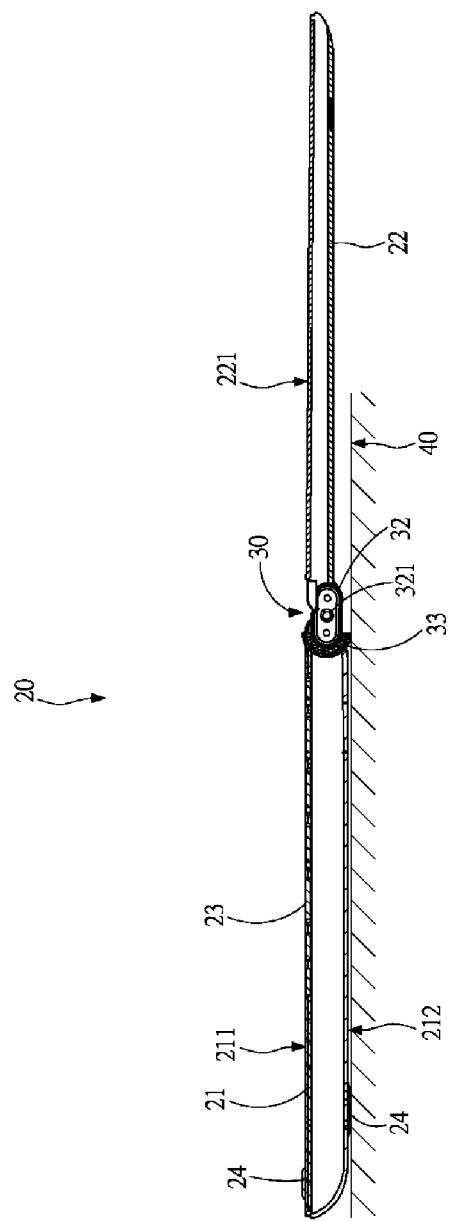

Please refer to FIG. 9 to FIG. 13, which are cross sectional views when the upper cover 22 is rotated to different angles. As shown in FIG. 9, when the electronic device 20 is under a closed mode, that is, when the angle between the display 221 of the upper cover 22 and the keyboard 23 of the main body 21 is 0°, the electronic device 20 is placed with the second surface 212 of the main body 21 facing toward a desk surface 40. Under this situation, the pad 33 disposed at the housing 32 and the pads 24 disposed at the second surface 212 provide the cushion function between the electronic device 20 and the desk surface 40. As shown in FIG. 10 and FIG. 11, when under a keyboard mode, that is, the angle between display 221 of the upper cover 22 and the keyboard 23 of the main body 21 is between 0° to 180°, the housing 32 and the connecting member 313 rotate with the first rotary shaft 311 as the rotation axis. At the same time, the pad 33 disposed at the housing 32 also rotates with the first rotary shaft 311 as the rotation axis. Since the pad 33 covers the outside of the housing 32 with respect to the first rotary shaft 311 in a U shape, the pad 33 can maintain the distance between the electronic device 20 and the desk surface 40 and provides the cushion function regardless of the rotation angle of the upper cover 22 between 0° to 180°.

Figure 12:
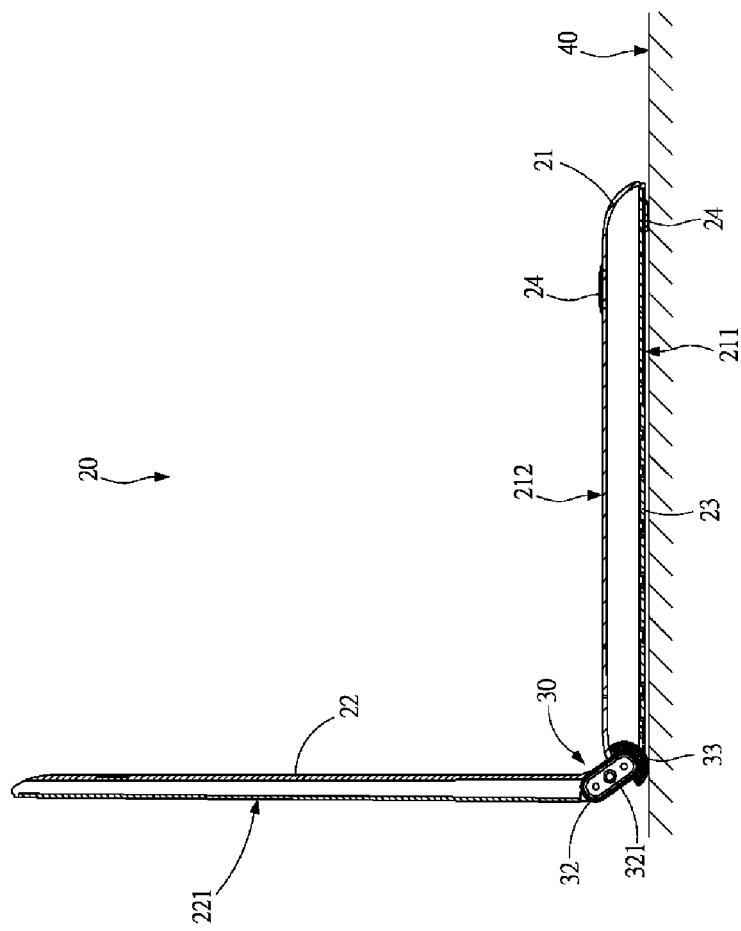

Please refer to FIG. 12, to draw the display 221 near the user under a video mode, the upper cover 22 may be rotated further backward, that is, the angle between the display 221 of the upper cover 22 and the keyboard 23 of the main body 21 is between 180° to 360°. Under this situation, for convenient purpose, the electronic device 20 is placed with the first surface 211 of the main body 21 facing toward the desk surface 40. As shown in FIG. 12, when the upper cover 22 is further rotated with the first rotary shaft 311 as the rotation axis until the angle between the display 221 of the upper cover 22 and the keyboard 23 of the main body 21 is 270°, the pad 33 of the housing 32 is also rotated to the side of the first surface 211. Therefore, the pad 33 disposed at the housing 32 and the pads 24 disposed at the first surface 211 can provide the cushion function between the first surface 211 of the electronic device 20 and the desk surface 40.

Figure 13:
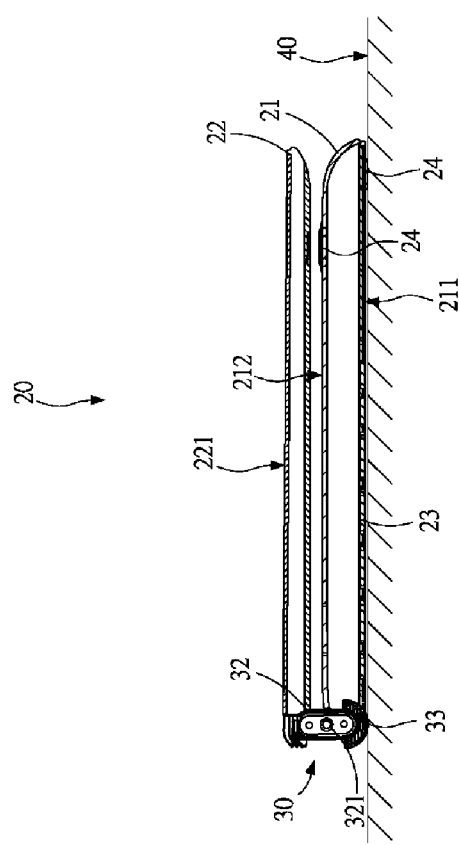

Similarly, as shown in FIG. 13, when the electronic device 20 is switched to the tablet mode, that is, the angle between the display 221 of the upper cover 22 and the keyboard 23 of the main body 21 is 360°, the pad 33 still can maintain a gap between the first surface 211 of the electronic device 20 and the desk surface 40 to provide the cushion function.

Therefore, by providing the hinge module 30 with the pad 33, the number of the pad used can be reduced. Originally, eight pads are supposed to be disposed at the two surfaces of the main body of the electronic device. Now it is only necessary to dispose two pads at the two surfaces of the main body, respectively, and add pads on the hinge module. By disposing two pads at the housing of the hinge module, when manufacturing the housing, the assembly of the pads can be accomplished simultaneously. By reducing the number of the pads, both the manufacturing costs and the assembly time can be reduced. Moreover, the two pads disposed at the housing would be moved to invisible places along with the rotation of the housing. Therefore the overall appearance of the electronic device would not be affected by the pads.

Figure 14:
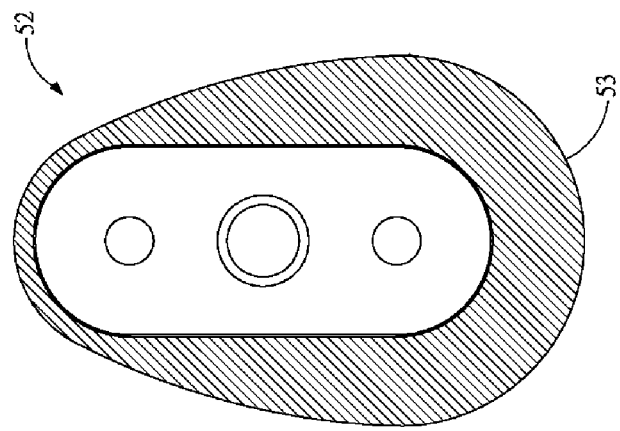
FIG. 14 is a sectional view of the housing according to the second embodiment of the invention.

Please refer to FIG. 14, which is a sectional view of the housing according to the second embodiment of the invention. Elements of this embodiment similar to the first embodiment are denoted by the same reference numbers, and relevant descriptions are omitted for concise purpose. The difference is that the housing 52 and the pad 53 are integrally formed, and the housing 52 and the pad 53 may be made of rubber, plastic or the combination thereof Therefore, the pad 53 is formed together with the housing 52, which unifies the appearance and simplifies the manufacturing sequence.

Please refer to FIG. 15, which is an exploded diagram of the electronic device according to the third embodiment of the invention. Elements of this embodiment similar to the first embodiment are denoted by the same reference numbers, and relevant descriptions are omitted for concise purpose. The hinge module 60 of this embodiment includes a biaxial hinge 61 and a pad 62. The biaxial hinge 61 includes a first rotary shaft 611, a second rotary shaft 612 and a connecting member 613. One end of the first rotary shaft 611 is fixed to the main body 21, and the other end is pivotally connected with the connecting member 613. One end of the second rotary shaft 612 is fixed to the upper cover 22, and the other end is also pivotally connected with the connecting member 613. The pad 62 is directly disposed on the connecting member 613 at the side of the first rotary shaft 611 of the biaxial hinge 61, and can even cover a portion of the first rotary shaft 611 and the connecting member 613 to make the pad 62 have a U-shaped cross section. In other aspects, the pad 62 may completely cover the whole connecting member 613. The pad 62 may be fixed to the connecting member by screws or adhesives.

Similarly, when the upper cover 22 rotates with respect to the main body 21, the connecting member 613 and the pad 62 rotate with the first rotary shaft 611 as the rotation axis. Therefore, the pad 62 can maintain a certain gap between the desk surface 40 and the first surface 211 or the second surface 212 of the electronic device 20 and provide the cushion function regardless of the rotation angle of the upper cover 22. Compared to the first embodiment, the usage of the housing in this embodiment is reduced. By providing the pad 62 in the first rotary shaft 611 directly, except for providing cushion without affecting the overall appearance, the usage and assembly of the components are reduced, which reduces costs and manufacturing time.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A hinge module for an electronic device, the electronic device comprising a main body and an upper cover, the main body comprising a top surface and a bottom surface, and the hinge module comprising:
   a biaxial hinge comprising a first rotary shaft, a second rotary shaft and a connecting member, one end of the first rotary shaft being fixed to the main body, another end of the first rotary shaft being pivotally connected with the connecting member, one end of the second rotary shaft being fixed to the upper cover, another end of the second rotary shaft being pivotally connected with the connecting member; and
   a pad disposed at the connecting member of the biaxial hinge, when the upper cover rotates with respect to the main body, the connecting member and the pad rotates using the first rotary shaft as a rotation axis, and wherein when the angle between the upper cover and the top surface of the main body is between 0° to 180°, at least a portion of the pad extends outwardly beyond the bottom surface of the main body, when the angle between the upper cover and the top surface of the main body is between 180° to 360°, at least a portion of the pad extends outwardly beyond the top surface of the main body.

2. The hinge module according to claim 1, wherein the connecting member comprises a housing, and the pad is disposed at the housing of the connecting member.

3. The hinge module according to claim 2, wherein the pad covers one side of the housing corresponding to the first rotary shaft.

4. The hinge module according to claim 2, wherein the housing and the pad are integrally formed, and material of the housing and the pad comprise rubber or plastic.

5. The hinge module according to claim 2, wherein the connecting member has a threaded hole, the housing has a through hole, when the housing is disposed around the biaxial hinge, a screw passes the through hole of the housing and is locked at the threaded hole of the connecting member.

6. The hinge module of claim 1, wherein the pad has a U-shape cross section and covers a portion of the first rotary shaft.

7. An electronic device, comprising:
   a main body comprising a top surface and a bottom surface;
   an upper cover; and
   a hinge module, the hinge module comprising:
      a biaxial hinge comprising a first rotary shaft, a second rotary shaft and a connecting member, one end of the first rotary shaft being fixed to the main body, another end of the first rotary shaft being pivotally connected with the connecting member, one end of the second rotary shaft being fixed to the upper cover, another end of the second rotary shaft being pivotally connected with the connecting member; and
      a pad disposed at the connecting member of the biaxial hinge, when the upper cover rotates with respect to the main body, the connecting member and the pad rotates using the first rotary shaft as a rotation axis, and wherein when the angle between the upper cover and the top surface of the main body is between 0° to 180°, at least a portion of the pad extends outwardly beyond the bottom surface of the main body, and when the angle between the upper cover and the top surface of the main body is between 180° to 360°, at least a portion of the pad extends outwardly beyond the top surface of the main body.

8. The electronic device according to claim 7, wherein the connecting member comprises a housing, and the pad is disposed at the housing of the connecting member.

9. The electronic device according to claim 8, wherein the pad covers one side of the housing corresponding to the first rotary shaft.

10. The electronic device according to claim 8, wherein the housing and the pad are integrally formed, and material of the housing and the pad comprise rubber or plastic.

11. The electronic device according to claim 8, wherein the connecting member has a threaded hole, the housing has a through hole, when the housing is disposed around the biaxial hinge, a screw passes the through hole of the housing and is locked at the threaded hole of the connecting member.

12. The electronic device according to claim 7, wherein the pad has a U-shape cross section and covers a portion of the first rotary shaft.

13. An electronic device, comprising:
   a main body having a top surface and a bottom surface;
   an upper cover; and
   a hinge module connecting the main body and the upper cover, the hinge module comprising:
      a biaxial hinge having a first rotary shaft, a second rotary shaft and a connecting member, a first end of the first rotary shaft being connected to the main body, a second end of the first rotary shaft being pivotally connected with the connecting member, a first end of the second rotary shaft being connected to the upper cover, a second end of the second rotary shaft being pivotally connected with the connecting member, the connecting member having a first end and an opposing second end; and
      a pad disposed at the first end of the connecting member of the biaxial hinge;
   the main body and the upper cover being movable with respect to each other about the biaxial hinge between a first position and a second position, in the first position the top surface of the main body and the upper cover being adjacent to each other with the second end of the connecting member being oriented such that at least a portion of the pad extends outwardly beyond the bottom surface of the main body, and in the second position the bottom surface of the main body and the upper cover being adjacent to each other with the second end of the connecting member being oriented such that at least a portion of the pad extends outwardly beyond the top surface of the main body.

14. The electronic device according to claim 13, wherein the main body and the upper cover are movable with respect to each other about the biaxial hinge to a first intermediate position between the first position and the second position, in the first intermediate position the top surface of the main body and the upper cover forming an included angle of approximately 180 degrees with the second end of the connecting member being oriented such that a first portion of the pad extends outwardly beyond the bottom surface of the main body and a second portion of the pad extends outwardly beyond the top surface of the main body.

15. The electronic device according to claim 13, wherein the main body and the upper cover are movable with respect to each other about the biaxial hinge to a first intermediate position between the first position and the second position, in the first intermediate position the top surface of the main body and the upper cover forming an included angle of less than 180 degrees with the second end of the connecting member being oriented such that at least a portion of the pad extends outwardly beyond the bottom surface of the main body.

16. The electronic device according to claim 15, wherein the main body and the upper cover are movable with respect to each other about the biaxial hinge to a second intermediate position between the first position and the second position, in the second intermediate position the top surface of the main body and the upper cover forming an included angle of greater than 180 degrees with the second end of the connecting member being oriented such that at least a portion of the pad extends outwardly beyond the top surface of the main body.

* * * * *